United States Patent
Sethuraman et al.

(10) Patent No.: US 6,525,116 B2
(45) Date of Patent: Feb. 25, 2003

(54) GYPSUM COMPOSITION WITH IONIC STYRENE BUTADIENE LATEX ADDITIVE

(75) Inventors: Gopalakrishnan Sethuraman, East Amherst, NY (US); W. Roy Burke, Tonawanda, NY (US); Amba Ayambem, East Amherst, NY (US)

(73) Assignee: National Gypsum Properties LLC, Charlotte, NC (US)

( * ) Notice: Subject to any disclaimer, the term of this patent is extended or adjusted under 35 U.S.C. 154(b) by 0 days.

(21) Appl. No.: 09/965,306

(22) Filed: Sep. 27, 2001

(65) Prior Publication Data

US 2002/0035180 A1 Mar. 21, 2002

Related U.S. Application Data

(63) Continuation-in-part of application No. 09/464,174, filed on Dec. 16, 1999, which is a continuation-in-part of application No. 09/237,512, filed on Jan. 26, 1999, now Pat. No. 6,184,287.

(51) Int. Cl.$^7$ .......................... C04B 11/11; C04B 16/02; C04B 24/06; C04B 24/26
(52) U.S. Cl. ..................... 524/8; 524/423; 524/458; 524/547; 524/555; 524/558; 524/575; 524/609; 523/201
(58) Field of Search ................. 524/8, 423, 458, 524/547, 555, 575, 609; 523/201

(56) References Cited

U.S. PATENT DOCUMENTS

| | | | |
|---|---|---|---|
| 3,043,790 A | 7/1962 | Sanders | 260/29.7 |
| 3,895,953 A | 7/1975 | Mehta | 106/88 |
| 3,915,919 A | 10/1975 | Nishioka et al. | 260/29.6 S |
| 3,936,408 A | 2/1976 | Adams et al. | 260/29.6 S |
| 3,943,996 A | 3/1976 | Guilbault et al. | 166/293 |
| 4,015,991 A | 4/1977 | Persinski et al. | 106/90 |
| RE29,595 E | 3/1978 | Adams et al. | 260/29.6 S |
| 4,086,201 A | 4/1978 | Peters et al. | 260/29.7 S |
| 4,110,293 A | 8/1978 | Sandstrom | 260/29.7 R |
| 4,151,150 A | 4/1979 | Peters et al. | 260/29.7 R |
| 4,202,809 A | 5/1980 | Eash | 260/29.7 S |
| 4,537,918 A | 8/1985 | Parcevaux et al. | 523/130 |
| 4,542,185 A | 9/1985 | Meunier | 525/70 |
| 4,659,773 A | 4/1987 | Itoh et al. | 524/817 |
| 4,721,160 A | 1/1988 | Parcevaux et al. | 166/293 |
| 4,767,460 A | 8/1988 | Parcevaux et al. | 106/90 |
| 4,806,164 A | 2/1989 | Brothers | 106/90 |
| 5,099,922 A | 3/1992 | Ganguli | 166/293 |
| 5,256,349 A | 10/1993 | Sato et al. | 264/86 |
| 5,258,428 A | 11/1993 | Gopalkrishnan | 524/5 |
| 5,274,027 A * | 12/1993 | Guillaume et al. | 524/814 |
| 5,302,655 A | 4/1994 | Guillaume et al. | 524/547 |
| 5,326,853 A | 7/1994 | Hayes | 524/813 |
| 5,362,798 A | 11/1994 | Hayes | 524/558 |
| 5,425,999 A | 6/1995 | Hayes | 428/511 |
| 5,494,963 A | 2/1996 | Hayes | 524/813 |
| 5,523,345 A | 6/1996 | Diehl et al. | 524/555 |
| 5,588,488 A | 12/1996 | Vijn et al. | 166/293 |
| 5,623,015 A | 4/1997 | Diehl et al. | 524/555 |
| 5,685,903 A | 11/1997 | Stav et al. | 106/735 |
| 5,718,759 A | 2/1998 | Stav et al. | 106/735 |
| 5,725,656 A | 3/1998 | Shimanovich et al. | 106/778 |
| 5,858,083 A | 1/1999 | Stav et al. | 106/735 |
| 5,879,825 A | 3/1999 | Burke et al. | 428/703 |
| 6,028,135 A * | 2/2000 | Keller et al. | 524/458 |
| 6,034,005 A | 3/2000 | Diehl | 442/164 |
| 6,171,388 B1 | 1/2001 | Jobbins | 106/778 |
| 6,184,287 B1 | 2/2001 | Westerman | 524/814 |
| 6,291,573 B1 * | 9/2001 | Pakusch et al. | 524/503 |

FOREIGN PATENT DOCUMENTS

JP    1224253 A2    9/1989 .......... C04B/28/18

OTHER PUBLICATIONS

Journal of the American Ceramic Society; Incorporating Advanced Ceramic Materials and Communications; vol. 74, No. 5, pp. 1117–1124 (May 1991).

* cited by examiner

Primary Examiner—David W. Wu
Assistant Examiner—Kelechi C. Egwim
(74) Attorney, Agent, or Firm—Howrey Simon Arnold & White

(57) ABSTRACT

Gypsum wallboard compositions are disclosed which contain functionalized styrene butadiene latex polymers. Methods for the use of the compositions in the manufacture of wallboard panels and sheets is presented.

42 Claims, No Drawings

GYPSUM COMPOSITION WITH IONIC STYRENE BUTADIENE LATEX ADDITIVE

REFERENCE TO RELATED APPLICATIONS

This application is a continuation-in-part of copending U.S. patent application Ser. No. 09/464,174, filed Dec. 16, 1999, which is a continuation-in-part of U.S. patent application Ser. No. 09/237,512, filed Jan. 26, 1999, now U.S. Pat. No. 6,184,287, issued Feb. 6, 2001.

FIELD OF THE INVENTION

The present invention relates generally to the production of low weight, high strength gypsum-containing compositions and panels. More particularly, the present invention is directed to the production and use of gypsum wallboard compositions and panels containing functionalized styrene butadiene latex polymers.

BACKGROUND OF THE INVENTION

A common method of constructing walls and ceilings includes the use of inorganic wallboard panels or sheets, such as gypsum wallboard, often referred to simply as "wallboard" or "drywall." Wallboard can be formulated for interior, exterior, and wet applications. The use of wallboard, as opposed to conventional walls made from wet plaster methods, is desirable because the installation of wallboard is ordinarily less costly and less cumbersome when compared with the installation of conventional plaster walls.

Walls and ceilings made with gypsum wallboard panels typically are constructed by securing, e.g., with nails or screws, the wallboard panels to structural members, such as vertically- and horizontally-oriented pieces of steel or wood often referred to as "studs." When forming a wall from wallboard panels there will generally be "joints" between adjacent wallboard panels because wallboard is typically supplied in standardsized sheets. In most wallboard construction, the joints are cosmetically treated with reinforcing tape and an adhesive material called "joint compound" so that the wall will have a smooth finish similar to that obtained with conventional plaster walls.

Generally, wallboard is produced by enclosing a core of an aqueous slurry containing calcined gypsum and other materials between two large sheets of wallboard cover paper. Various types of cover paper are known in the art. After the gypsum slurry has set (i.e., reacted with the water present in the aqueous slurry) and dried, the formed sheet is cut into standard sizes. Methods for the production of gypsum wallboard generally are described, for example, by Michelsen, T. "Building Materials (Survey)," *Kirk-Othmer Encyclopedia of Chemical Technology*, (1992 4$^{th}$ ed.), vol. 4, pp. 618–619, the disclosure of which is hereby incorporated herein by reference.

A major ingredient of the gypsum wallboard core is calcium sulfate hemihydrate, commonly referred to as "calcined gypsum," "stucco," or "plaster of Paris." Stucco has a number of desirable physical properties including, but not limited to, its fire resistance, thermal and hydrometric dimensional stability, compressive strength, and neutral pH.

Typically, stucco is prepared by drying, grinding, and calcining natural gypsum rock (i.e., calcium sulfate dihydrate). The drying step in the manufacturer of stucco includes passing crude gypsum rock through a rotary kiln to remove any free moisture (i.e., water which is not chemically bound) present in the rock.

The dried rock is then passed through a roller mill (or impact mill type of pulverizer), wherein the rock is ground or comminuted to a desired fineness. The dried, fine-ground gypsum can be referred to as "land plaster." The land plaster is used as feed in calcination processes for conversion to stucco.

The calcination (or dehydration) step in the manufacture of stucco is performed by heating the land plaster to liberate a portion of the chemically bound water molecules. Calcination of stucco can generally be described by the following chemical equation which shows that heating calcium sulfate dihydrate yields calcium sulfate hemihydrate (stucco) and water vapor:

$$CaSO_4 \cdot 2H_2O + heat \rightarrow CaSO_4 \cdot \tfrac{1}{2}H_2O + 1\tfrac{1}{2}H_2O.$$

This calcination process step is performed in a "calciner," of which there are several types known by those of skill in the art.

Uncalcined calcium sulfate (i.e., land plaster) is the "stable" form of gypsum. However, calcined gypsum, or stucco, has the desirable property of being chemically reactive with water, and will "set" rather quickly when the two are mixed together. The setting reaction is a reversal of the above-described chemical reaction that occurs during the calcination step. Accordingly, the setting reaction proceeds according to the following chemical equation, which shows that calcium sulfate hemihydrate is rehydrated to its dihydrate state upon the addition of sufficient water:

$$CaSO_4 \cdot \tfrac{1}{2}H_2O + 1\tfrac{1}{2}H_2O \rightarrow CaSO_4 \cdot 2H_2O + heat.$$

The actual time required to complete the setting reaction generally depends upon the type of calciner and the type of gypsum rock that is used to produce the gypsum, and can be controlled to some extent by using additives such as, for example, retarders, set accelerators, and/or stabilizers. Generally, the time required for rehydration can be as little as about two minutes to as long as about eight hours, depending on the quantity of retarders, set accelerators, and/or stabilizers present.

Gypsum wallboard is generally manufactured utilizing commercial processes that are capable of operation under continuous, high-speed conditions. A conventional process for manufacturing the core composition of gypsum wallboard initially includes the premixing of dry ingredients in a high-speed mixing apparatus. The dry ingredients can include calcium sulfate hemihydrate (stucco), an accelerator, and an antidesiccant (e.g., starch).

The dry ingredients are typically mixed together with a "wet" (aqueous) portion of the core composition in a pin mixer apparatus. The wet portion can include a first component, commonly referred to as a "paper pulp solution," that includes a mixture of water, paper pulp, and, optionally, one or more fluidity-increasing agents, and a set retarder. The paper pulp solution provides a major portion of the water that forms the gypsum slurry of the core composition. A second wet component can include a mixture of strengthening agents, foaming agents, and other conventional additives, if desired. Together, the aforementioned dry and wet portions comprise an aqueous gypsum slurry that eventually forms a gypsum wallboard core.

After the aqueous gypsum slurry is prepared, the slurry and other desired ingredients are continuously deposited to form a gypsum wallboard core (hereinafter "wallboard core" or "core") slurry between two continuously-supplied moving sheets of cover paper. The two cover sheets are typically a pre-folded face paper and a backing paper. As the slurry is deposited onto the face paper, the backing paper is brought down atop the deposited core slurry and bonded to the prefolded edges of the face paper.

The whole assembly is sized for thickness utilizing a roller bar or forming plate. The deposited core slurry is then allowed to set between the two cover sheets, thereby forming a board. The continuously-produced board is cut into panels of a desired length, which are vertically-stacked, and then passed through a drying kiln wherein excess water is removed from the board to form a strong, rigid, fire-resistant building material.

The cover sheets used in the process typically are multi-ply paper manufactured from re-pulped newspapers. The face paper has an unsized inner ply which contacts the core slurry such that gypsum crystals can grow up to (or into) the inner ply. This gypsum crystal-paper interaction is the principal form of bonding between the core slurry and the cover sheet. The middle plies are sized and an outer ply is more heavily sized and treated to control absorption of paints and sealers. The backing paper is also a similarly constructed multi-ply sheet. Both cover sheets must have sufficient permeability to allow for water vapor to pass through during the downstream board drying step(s).

Standardized sheets (or panels) of wallboard typically are about four feet (about 1.22 meters) wide and about 8 feet to about 16 feet (about 2.4 meters to about 4.9 meters) in length. Sheets typically are available in thicknesses varying in a range of about ¼ inch to about one inch (about 0.6 centimeters to about 2.6 centimeters).

In order to provide satisfactory strength, commercially-available gypsum wallboard generally requires a density of about 1650 pounds to about 1700 pounds (about 748 kilograms to about 772 kilograms) per thousand square feet (lbs/MSF) of one-half inch board. Because heavy or high-density gypsum wallboards are more costly and difficult to manufacture, transport, store, and manually install at job sites when compared with lighter or low-density boards, various attempts have been made to reduce board weight and density without sacrificing board strength.

Often, however, where wallboard is formulated to have a density less than about 1650 lbs/MSF of one-half inch board, the resulting strength is unacceptable for commercial use.

While it is possible to formulate lighter and less dense wallboard, for example, through the inclusion of lightweight fillers and foams into a gypsum slurry, many of the lighter and less dense wallboard products are of a quality ill-suited for commercial use. It has been suggested that reduced density wallboard of acceptable strength can be obtained by incorporating lightweight thermoplastic particles such as, for example, pre-expanded polystyrene or polyethylene latex polymer particles, into the gypsum slurry. However, this proposed solution is deficient because latex polymers typically form aggregates in a high ionic strength environment, such as, for example, that of a gypsum slurry. Consequently, latex polymer particles typically are not dispersed uniformly throughout the gypsum product. Such a non-uniform composition is very undesirable because it can result in local areas of weakness in the final gypsum product.

U.S. Pat. No. 6,171,388 to Jobbins suggests that the non-uniform distribution of latex polymer particles can be overcome by adding an excess of nonionic surfactant(s) along with one or more latex polymers to a gypsum slurry. The inventor explains that the latex particles are better distributed throughout the slurry, that the resulting material has an improved strength to weight ratio, and that the slurry viscosity is decreased because of the added surfactant(s). Accordingly, by increasing the amount of nonionic surfactants in the gypsum slurry, the stability of the latex particles against a high ionic environment is improved.

However, while it may be possible to formulate gypsum slurries to include additional surfactants in order to confer substantial stability to light-weight polymeric particles against a high ionic strength environment, gypsum slurries already contain a significant amount of surfactants and/or foaming agents (e.g., to facilitate the introduction of air bubbles into the gypsum slurry in order to reduce gypsum board weight). The various surfactants and/or foaming agents present in the gypsum slurry may interact with one another, thereby reducing their effectiveness, both as foaming agents and in conveying stability to the latex polymer particles against the high ionic strength environment of a gypsum slurry. Accordingly, it is desirable to avoid introducing an excess of additional surfactants into the gypsum slurry.

In view of the foregoing, it would be desirable to produce high-strength gypsum wallboard having weights and densities generally equal to or slightly less than those produced by conventional methods. Furthermore, such reduced weight and density boards should have a composition which is substantially uniform throughout the gypsum product, and should meet industry standards, having strengths similar to, or greater than, conventional wallboard. Moreover, such wallboard also should be able to be manufactured using high-speed manufacturing apparatus and not suffer from other negative side-effects. For example, such high-strength wallboard should be able to set and dry within a reasonable period of time.

SUMMARY OF THE INVENTION

The present invention provides such compositions and methods for making high-strength wallboard, preferably without introducing an excess of additional surfactants into the gypsum slurry.

Additionally, the present invention provides compositions and methods for making high-strength wallboard having substantially uniform compositions because the tendency for latex particles to form aggregates is substantially diminished.

Moreover, the present invention provides compositions and methods for making high-strength gypsum wallboard having weights and densities generally equal to or slightly less than wallboard produced by conventional methods.

Furthermore, the present invention provides compositions and methods for making high-strength wallboard using high-speed manufacturing apparatus.

One aspect of the present invention is a composition suitable for use in the manufacture of gypsum materials, comprising calcium sulfate hemihydrate, water and a functionalized styrene butadiene latex polymer.

An additional aspect of the present invention is a gypsum wallboard panel comprising a first cover sheet, a second cover sheet and a gypsum wallboard core disposed between said cover sheets, said core comprising calcium sulfate hemihydrate, water and a functionalized styrene butadiene latex polymer.

Another aspect of the present invention is a method of making a gypsum wallboard comprising the steps of forming a slurry comprising calcium sulfate hemihydrate, water, and a functionalized styrene butadiene latex polymer, mixing said slurry, depositing said slurry onto a cover sheet, and applying a second cover sheet atop the deposited core slurry.

Yet another aspect of the present invention is a composition suitable for use in the manufacture of gypsum materials comprising calcium sulfate hemihydrate, water and functionalized styrene butadiene latex polymer particles, wherein the functionalized styrene butadiene latex polymer particles have a median diameter between about 80 nanometers and about 220 nanometers and a gel content of about 15 percent by weight to about 85 percent by weight.

Other advantages of the present invention may become apparent to those skilled in the art from a review of the following detailed description, taken in conjunction with the examples and the appended claims.

DESCRIPTION OF ILLUSTRATIVE EMBODIMENTS

According to the present invention, there are provided core compositions including one or more functionalized styrene butadiene latex polymers which are suitable for use in the production of gypsum wallboard and other gypsum-containing products. The present invention further provides gypsum wallboard panels containing such functionalized styrene butadiene latex polymers and methods of making gypsum wallboard through the use of the aforementioned core compositions. Functionalized styrene butadiene latex polymers have excellent dispersion properties in high electrolyte environments such as the environment found in a gypsum slurry. Accordingly, the agglomeration of latex polymers that result in local areas of weakness in prior art gypsum products containing thermoplastic particles is avoided or substantially decreased, and gypsum products containing a uniform distribution of light weight thermoplastic particles are obtained.

Functionalized styrene butadiene polymers for use with the compositions and methods of the present invention have been previously described, for example, in U.S. Pat. No. 6,184,287 to Westerman, the disclosure of which is hereby incorporated herein by reference. As described in U.S. Pat. No. 6,184,287, functionalized styrene butadiene polymers can be formed, for example, by aqueous emulsion polymerization of a monomeric mixture comprising at least styrene and butadiene in the presence of a seed polymer which is prepared by aqueous emulsion polymerization of styrene and a salt of 2-acrylamido-2-methylpropanesulfonic acid is used. It may be possible to incorporate less of the salt of 2-acrylamido-2-methylpropanesulfonic acid into the functionalized styrene butadiene polymers for use in accordance with the present invention than is contained in those styrene butadiene polymers described in U.S. Pat. No. 6,184,287, as it is anticipated that the ionic conditions presented in a gypsum slurry are less severe than those present in gas and oil well drilling/cementing applications.

Accordingly, functionalized styrene butadiene latex polymer particles having high stability in high ionic strength environments are produced by modifying latex polymers, such as styrene butadiene, to include a monomer that adds ionic character to the polymer, such as, for example, a salt of 2-acrylamido-2-methylpropanesulfonic acid. In order for a latex polymer to have high stability in high ionic strength environments, a latex polymer should not exhibit significant coagulation or flocculation, which can be determined visually as lumps of agglomerated smaller latex particles, when 10 mL of a 2 percent by weight calcium chloride aqueous solution is added to 50 mL of the latex with stirring over a time period of between 5 seconds and 30 seconds.

The content of styrene and butadiene in the functionalized styrene butadiene polymers for use in the compositions and methods of the present invention can vary. Typically, the functionalized styrene butadiene polymers contain between 20 percent by weight and 95 percent by weight styrene. Preferably, the functionalized styrene butadiene polymers contain between 45 percent by weight and 90 percent by weight styrene. Even more preferably, the functionalized styrene butadiene polymers contain between 65 percent by weight and 85 percent by weight styrene. Further, the functionalized styrene butadiene polymers typically contain between 4 percent by weight and 60 percent by weight butadiene. Preferably, the functionalized styrene butadiene polymers contain between 7 percent by weight and 40 percent by weight butadiene. Even more preferably, the functionalized styrene butadiene polymers contain between 10 percent by weight and 30 percent by weight butadiene.

The styrene and butadiene content of the functionalized styrene butadiene polymers can also be described by a weight ratio of styrene content to butadiene content. Typically, there are between approximately 10 parts by weight and approximately 1 part by weight of styrene for every part by weight of butadiene. Preferably, there are between approximately 7 parts by weight and approximately 1.5 parts by weight of styrene for every part by weight of butadiene. Even more preferably, there are between approximately 6 parts by weight and approximately 2 parts by weight of styrene for each part of butadiene.

As set forth previously, the functionalized styrene butadiene polymers for use with the compositions and methods of the present invention comprise not only styrene and butadiene, but also contain one or more monomers that convey stability to the polymer particles against high ionic strength environments, including multivalent ions. By modifying styrene butadiene polymers to include a monomer which conveys stability against multivalent ions, and incorporating such functionalized styrene butadiene polymers into a gypsum slurry, reduced weight and density boards can be advantageously manufactured. Preferably, reactive monomers which add anionic character to the polymer particles are incorporated into the styrene butadiene latex polymer particles of the present invention.

Preferably, monomers that addition polymerize to form a homopolymer which is water soluble when having a molecular weight of less than or equal to 5000 grams per mole are used to convey ionic character to the functionalized styrene butadiene polymers. Suitable monomers that convey ionic character typically contain at least one functionality selected from the group consisting of carbonyl, carboxyl, hydroxyl, amine, amide, ether, ester, sulfate, sulfonate, sulfinate, sulfamate, phosphate, phosphonate, and phosphinate. Examples of suitable monomers that convey ionic character include 2-acrylamido-2-methyl propanesulfonic acid salts, styrene sulfate salts, styrene sulfonate salts, allyl sulfonate salts, 3-sulfopropyl acrylate salts, 3-sulfopropyl methacrylate salts, 2-sulfoethyl acrylate salts, 2-solfoethyl methacrylate salts, maleic acid, salts of maleic acid, itaconic acid and salts of itaconic acid. The cations of these salts are normally methods such as sodium and potassium or organic cations such as ammonium. Preferably, the cations are sodium or potassium. The preferred monomer for conveying stability against high ionic strength environments is a salt of 2-acrylamido-2-methyl propanesulfonic acid. Most preferably, the sodium salt of 2-acrylamido-2-methyl propanesulfonic acid is incorporated into the functionalized styrene butadiene polymers of the present invention.

The content of the monomer(s) that conveys ionic character to the styrene butadiene latex polymers for use in the compositions and methods of the present invention is typically between about 0.25 percent by weight and about 20 percent by weight of the functionalized styrene butadiene polymer. Preferably, the functionalized styrene butadiene polymer will include between about 0.5 percent by weight and about 10 percent by weight of monomer that conveys ionic character. More preferably, the functionalized styrene butadiene polymer will include between about 1 percent by weight and about 5 percent by weight of monomer that conveys ionic character.

In addition to styrene, butadiene, and one or more monomer that conveys ionic character, the styrene butadiene polymers of the present invention may also include about 0.25 percent by weight to about 20 percent by weight of one or more comonomers selected from the group consisting of hydroxyethyl acrylate, hydroxyethyl methacrylate, acrylonitrile, methacrylonitrile, acrylamide and methacrylamide. Functionalized styrene butadiene polymers in accordance with the present invention which include one or more of those comonomers exhibit enhanced stability against high ionic strength environments including multivalent ions. More typically, the polymers of the present invention include about 0.5 percent by weight to about 10 percent by weight of one or more of such comonomers. Even more typically, the polymers of the present invention include about 1 percent by weight to about 4 percent by weight of one or more such comonomers.

Further, the functionalized styrene butadiene polymers in accordance with the present invention may include other addition monomers. Examples of such addition monomers include isoprene, chloroprene, alpha-methylstyrene, 4-methylstyrene, 4-tertbutylstyrene, 4-ethylstyrene, divinylbenzene, vinylidene chloride, 2-vinylpyridine, 4-vinylpyridine, acrylic acid (including metal and ammonium salts thereof), methacrylic acid (including metal and ammonium salts thereof), substituted and unsubstituted amides (aside from acrylamide and methacrylamide which have been previously described herein as being comonomers that enhance the stability of the styrene butadiene polymers in accordance with the present invention against multivalent ions), nitriles, and $C_1$ to $C_{12}$ esters. The polymers in accordance with the present invention should not contain more than about 30 percent by weight of one or more of the listed addition monomers. More typically, the polymers in accordance with the present invention contain less than about 15 percent by weight of addition monomer(s).

For example, styrene butadiene polymers which are particularly useful in the methods and compositions according to the present invention may include approximately 2 percent by weight to approximately 6 percent by weight, preferably approximately 2.5 percent by weight to approximately 5.5 percent by weight, of the sodium salt of 2acrylamido-2-methylpropanesolfonic acid, approximately 65 percent by weight to approximately 80 percent by weight, preferably approximately 67.2 percent by weight to approximately 77.5 percent by weight, of styrene, approximately 15 percent by weight to approximately 30 percent by weight, preferably approximately 15 percent by weight to approximately 26 percent by weight, of butadiene, approximately 0 percent by weight to approximately 3 percent by weight of hydroxyethyl acetate, and approximately 0 percent by weight to approximately 10 percent acrylonitrile.

Typically, the functionalized styrene butadiene polymers in accordance with the present invention are prepared via well known aqueous emulsion polymerization methods. Styrene, butadiene, one or more monomers that conveys ionic character to the polymer and, optionally, one or more comonomers and one or more addition monomers, are generally polymerized in the presence of water, free radical initiators, emulsifying surfactants and chelating agents. Preferably, a non-ionic surfactant or an anionic surfactant is used to emulsify the monomer constituents. Additional ingredients including chain transfer agents, biocides, defoamers and antioxidants may also be added to the mixture.

Upon activation of the free radial initiator, the constituent monomers polymerize to form a polymeric product in accordance with the present invention. To a certain extent, the arrangement of the constituent monomers in the final product can be controlled through the order in which the monomers are added to the reaction mixture. When all of the constituent monomers are added simultaneously, the product will have a more random distribution of monomers than when the constituent monomers are added sequentially or in stages.

The amount of functionalized styrene butadiene polymer that is incorporated into a gypsum slurry can vary a great deal, and nearly any amount can be added to a gypsum slurry. Preferably, one or more functionalized styrene butadiene polymers are added to a gypsum slurry in a total amount from about 0.1 percent by weight to about 10 percent by weight based on the weight of calcium sulfate hemihydrate. More preferably, one or more functionalized styrene butadiene polymers are added to a gypsum slurry in an amount from about 0.25 percent by weight to about 5 percent by weight based on the weight of calcium sulfate hemihydrate. Most preferably, one or more functionalized styrene butadiene polymers are added to a gypsum slurry in an amount from about 0.25 percent by weight to about 5 percent by weight based on the weight of calcium sulfate hemihydrate. Most preferably, one or more functionalized styrene butadiene polymers are added to a gypsum slurry in an amount from about 0.5 percent by weight to about 1.5 percent by weight based on the weight of calcium sulfate hemihydrate.

Typically, the polymeric chains that are formed are further reacted or crosslinked by heat, light, ultraviolet radiation, or other reactants and/or catalysts to form a gel which has significantly increased strength with respect to the individual polymer chains. As used herein, the term "gel content" refers to the proportion of the polymer chains of the polymer particles that have been crosslinked, thereby constituting a part of the gel network. Preferably, the styrene butadiene latex particles for use in the present invention have a gel content from about 15 percent to about 85 percent. More preferably, and to achieve the full advantage of that present invention, the styrene butadiene latex particles have a gel content from about 30 percent to about 70 percent. Most preferably, the styrene butadiene latex particles have a gel content of about 50 percent.

The gel content of the functionalized styrene butadiene polymer particles can be quantitatively measured. For example, by continuously extracting (e.g., by soxhlet extracting) the reaction product after crosslinking processing is complete, the weight of the crosslinked polymer material can be obtained. A continuous extraction method allows polymers which are soluble to be removed from the mass of crosslinked polymer which typically is not soluble in most or any solvents. Accordingly, the use of a solvent in which a polymer is soluble, and in which the crosslinked polymer is insoluble, is necessary for the successful implementation of this procedure. By dividing the weight of the crosslinked polymer material by the total weight of the material that was continuously extracted, and multiplying by 100, the gel content value may be obtained. For example, 100 grams of a thermoplastic polymer which is soluble in chloroform can be crosslinked with ultraviolet radiation. The gel product is placed in a soxhlet extractor and washed repeatedly with hot chloroform. Once the extraction is complete, the gel is dried and weighed. If the mass of the gel is 90 grams, then the gel content is 90% (the other 10% mass was unreacted polymer dissolved by the chloroform). The degree of crosslinking can be regulated by the time, intensity, and concentration of the polymer treatment.

In another embodiment according to the present invention, the monomers are copolymerized with and crosslinked by one or more polyacrylates. Preferably, dimethacrylates having from 2 to 30 ethoxy units between each methacrylate functionality are used. More preferably, dimethacrylates having at least four ethoxy units between each methacrylate functionality are used, and most preferably, dimethacrylates having from four to 22 ethoxy units between methacrylate functionalities are utilized. The incorporation of such flexible crosslinking agents allows for the production of materials that can withstand substantial compressive forces, without incurring damage to the gypsum crystals of the gypsum-containing product.

The functionalized styrene butadiene polymers for use with the methods and compositions of the present invention typically have a median particle diameter between about 80 nanometers and about 220 nanometers. More preferably, the median particle diameter is between about 140 and about 200 nanometers. Most preferably, the median particle diameter is between about 170 and about 190 nanometers. The median particle diameter of the functionalized styrene butadiene polymers can be determined by known methods including electron microscopy techniques. Furthermore, the particle diameter can be varied by using techniques known by those of ordinary skill in the art, for example, by varying the concentration of emulsifying surfactant(s) in the polymerization reaction. Greater concentrations of emulsifying surfactant(s) result in increased particle number and decreased particle diameter. Surfactants include sodium stearate, sodium laurate, sodium palmitate, potassium stearate, potassium laurate, potassium palmitate, sulfates (e.g. sodium lauryl sulfate), and sulfonates (e.g. sodium dodecylbenzene sulfonate). Non-ionic surfactants such as poly(ethylene oxide), poly(vinyl alcohol) and hydroxyethyl cellulose are sometimes used in conjunction with other surfactants. Surfactants are generally used at about 0.2 weight % to about –3 weight % based on the amount of water/solvent.

A preferred method for manufacturing the core composition and wallboard of the present invention initially includes the premixing of dry ingredients in a mixing apparatus. The dry ingredients can include calcium sulfate hemihydrate (stucco), an accelerator, and an antidesiccant (e.g., starch), as described below in greater detail.

The dry ingredients are mixed together with a "wet" (aqueous) portion of the core composition in a pin mixer apparatus. The wet portion can include a first component (referred to as a "paper pulp solution") that includes a mixture of water, paper pulp, and optionally, fluidity-increasing agents. A set retarder can also be included. The paper pulp solution provides a major portion of the water that forms the gypsum slurry of the core compositions. A second wet component preferably includes a mixture of functionalized styrene butadiene latex polymer, strengthening agent(s), foaming agent(s), and other conventional additives, if desired. It should be noted that the functionalized polymeric materials are typically supplied as water emulsions to facilitate ease of incorporation into the gypsum slurry, and can also be added directly into the mixing apparatus or can be incorporated into the pulp solution prior to addition to the mixing apparatus.

The produced core composition slurry is deposited between paper cover sheets to form a sandwich. The core composition is allowed to cure or set, whereby calcium sulfate hemihydrate is converted to calcium sulfate dihydrate. The product is then preferably dried to remove any excess water not consumed in the reaction forming the calcium sulfate dihydrate (Excess water is preferably included to decrease the viscosity of the slurry during production.)

The setting reaction produces gypsum crystals, which are interwoven to contribute strength to the wallboard core. The resulting crystal-to-crystal interaction is important to the final strength of the gypsum wallboard product.

The gypsum crystals also preferably interlock with paper fibers protruding from the surface or cover papers, thus bonding the papers to the core. This bonding or interaction also increases the strength of the wallboard product. The compositions of the present invention also preferably are able to produce wallboards having increased paper-to-core bonding.

The method of the invention allows a substantial reduction in board weight and density, while producing wallboard that can meet industry strength standards. By way of example only, the methods of the present invention can allow for the production of high strength wallboard weighing about 1550 pounds per thousand square feet to 1650 pounds per thousand square feet (based on one-half inch thick board), and even lower in some cases.

The preferred ingredients of the wallboard core composition of the present invention will now be described in more detail. The first ingredient of the wallboard core composition of the present invention is calcium sulfate hemihydrate, or stucco ($CaSO_4 \cdot \frac{1}{2} H_2O$). Calcium sulfate hemihydrate can be produced by the methods described above. Calcium sulfate is described, for example, by Petersen, D. J., et al. "Calcium Compounds (Calcium Sulfate)," *Kirk-Othmer Encyclopedia of Chemical Technology*, (1992 $4^{th}$ ed.), vol. 4, pp. 812–26.

As is known by those skilled in the art, there are two types of calcium sulfate hemihydrate, the a-hemihydrate form and the β-hemihydrate form. These two forms are typically produced by different types of calcination processes and differed structurally to some extent. Either type of calcium sulfate hemihydrate is suitable for use with the present invention.

Other dry ingredients are preferably included in the core composition, including an accelerator which can be used to control, within certain limits, the crystal growth rate and set time of the stucco. Examples of suitable accelerators include ball mill accelerators ("BMA") and potassium sulfate, although many others are known to those skilled in the art. In some cases, the presence of the functionalized styrene butadiene polymer in accordance with the present invention may require increased amounts of accelerator, e.g., 0.04 percent by weight to 0.50 percent by weight, based on the weight of calcium sulfate hemihydrate.

An antidessicant such as starch is also included in order to prevent the dehydration of calcium sulfate dihydrate crystals formed during setting of the core composition. In some products, additional lightweight aggregates (e.g., expanded perlite or vermiculite) can be included in the dry ingredients.

An aqueous slurry or solution of paper pulp is also included in the core composition. The pulp solution comprises water and paper fibers ("paper pulp"), and may also include a retarder, corn starch and/or potash. The retarder is used in conjunction with the aforementioned accelerator in order to tailor the set time of the core composition. Retarding agents are typically used with the present invention at very low rates (if at all), for example at about 0.0007 percent by weight, based on the weight of the core composition.

The paper pulp solution can also include one or more of a number of additives that increase the fluidity of the slurry and/or reduce the water requirements of slurry. Materials used as fluidity-enhancing and/or water-reducing agents include "lignosulfonates" which are available commercially either in liquid or powder form. Agents supplied in liquid form can be either incorporated in the pulp solution or added directly to the mixing operation.

The pulp solution can be prepared by blending or mixing the above ingredients with water in a blending apparatus. Alternatively, a concentrated pulp solution using only a small volume of water can be produced. In this case, the remainder of the core mix water requirement is made up with a separate water source. An excess of water with respect to the above-described rehydration reaction is preferably included in order to provide satisfactory flowability of the core composition. Typically, about 75 weight parts water are used per 100 weight parts stucco. Preferably, high shear mixing "pulps" the material, forming a homogenous solution or slurry. The pulp solution can be transferred to a holding vessel, from which it can be continuously added to the core composition mix. The paper fibers in the pulp solution serve to enhance the flexibility of the gypsum wallboard. Gypsum wallboard made without fibers is typically very brittle and more susceptible to breakage during handling. The paper fibers also aid in evenness of drying during manufacture, as well as enhance the ability of the final wallboard product to accept and hold nails during installation.

As indicated above, the wet portion of the core composition also preferably includes a component that incorporates foam into the slurry, a strength-enhancing agent, and functionalized styrene butadiene latex polymer. Foam introduces air voids into the core though the use of a foam that contains very little solid material, but is resilient enough to resist substantial breakdown in the mixing operation. In this manner, the density of the core can be controlled. Known foaming agents may be supplied in either liquid or flake (powdered) form, and may be produced from soaps known in the art. Strengthening agents in the form of an acrylic polymer emulsion suitable for use in the present invention are disclosed in U.S. Pat. No. 5,879,825, the disclosure of which is hereby incorporated herein by reference.

Furthermore, gypsum wallboard can be adapted for wet and exterior applications by incorporating various materials into the core to impart increased water absorption resistance to the board. Useful materials include silicone water repellents, waxes, and asphalt emulsions. These materials are typically supplied as water emulsions to facilitate ease of incorporation into the board core, and can be added directly into the mixing apparatus or incorporated into the pulp solution prior to addition to the mixing apparatus. The foregoing detailed description is given for clearness of understanding only, and no unnecessary limitations should be understood therefrom, as modifications within the scope of the present invention will be apparent to those of ordinary skill in the art.

What is claimed is:

1. A composition suitable for use in the manufacture of gypsum materials, the composition comprising:
    calcium sulfate hemihydrate;
    water; and,
    a functionalized styrene butadiene latex polymer crosslinked by a dimethacrylate having from 2 to 30 ethoxy units between methacrylate functionalities.

2. The composition of claim 1, wherein the functionalized styrene butadiene latex polymer includes at least about 0.25 percent by weight of a monomer that conveys ionic character to the functionalized styrene butadiene latex polymer.

3. The composition of claim 2, wherein the monomer is selected from the group consisting of 2-acrylamido-2-methyl propanesulfonic acid salt, styrene sulfate salt, styrene sulfonate salt, allyl sulfonate salt, 3-sulfopropyl acrylate salt, 3-sulfopropyl methacrylate salt, 2-sulfoethyl acrylate salt, 2-sulfoethyl methacrylate salt, maleic acid, salts of maleic acid, itaconic acid, salts of itaconic acid, and mixtures thereof.

4. The composition of claim 2, wherein the monomer is a metal salt of 2-acrylamido-2-methyl propanesulfonic acid.

5. The composition of claim 2, wherein the monomer is a sodium salt of 2-acrylamido-2-methyl propanesulfonic acid.

6. The composition of claim 1, wherein the functionalized styrene butadiene latex polymer is prepared by aqueous emulsion polymerization of a monomeric mixture comprising styrene and butadiene in the presence of a seed polymer prepared by aqueous polymerization of styrene and a salt of 2-acrylamido-2-methyl propanesulfonic acid.

7. The composition of claim 3, wherein the functionalized styrene butadiene latex polymer further includes one or more comonomers selected from the group consisting of hydroxyethyl acrylate, hydroxyethyl methacrylate, acrylonitrile, methacrylonitrile, acrylamide and methacrylamide.

8. The composition of claim 1, wherein the functionalized styrene butadiene latex polymer comprises from about 45 percent by weight to about 90 percent by weight styrene, from about 7 percent by weight to about 40 percent by weight, butadiene, and from about 2 percent by weight to about 10 percent by weight of a monomer that conveys ionic character to the functionalized styrene butadiene latex polymer.

9. The composition of claim 8, wherein the ratio of the weight of styrene to the weight of butadiene is about 10:1 to about 1:1.

10. The composition of claim 1, wherein the functionalized styrene butadiene latex polymer comprises about 70 percent by weight to about 85 percent by weight styrene, about 10 percent by weight to about 30 percent by weight butadiene, and about 3 percent by weight to about 7 percent by weight to a monomer that conveys ionic character to the functionalized styrene butadiene latex polymer.

11. The composition of claim 10, wherein the ratio of the weight of styrene to the weight of butadiene is about 7:1 to about 1.5:1.

12. The composition of claim 10, wherein the ratio of the weight of styrene to the weight of butadiene is about 6:1 to about 2:1.

13. The composition of claim 1, wherein the functionalized styrene butadiene latex polymer is added in an amount of about 0.1 percent by weight to about 10 percent by weight based on the weight of calcium sulfate hemihydrate.

14. The composition of claim 1, wherein the functionalized styrene butadiene latex polymer is added in an amount of about 0.25 percent by weight to about 5 percent by weight based on the weight of calcium sulfate hemihydrate.

15. The composition of claim 1, wherein the functionalized styrene butadiene latex polymer is added in an amount of about 0.5 percent by weight to about 1.5 percent by weight based on the weight of calcium sulfate hemihydrate.

16. The composition of claim 1, wherein the median particle diameter of the functionalized styrene butadiene latex polymer is about 80 nanometers to about 220 nanometers.

17. The composition of claim 1, wherein the median particle diameter of the functionalized styrene butadiene latex polymer is about 170 nanometers to about 190 nanometers.

18. The composition of claim 1, wherein the functionalized styrene butadiene latex polymer has a gel content of about 15 percent by weight to about 85 percent by weight.

19. The composition of claim 1, wherein the functionalized styrene butadiene latex polymer has a gel content of about 30 percent by weight to about 70 percent by weight.

20. The composition of claim 1, wherein the functionalized styrene butadiene latex polymer has a gel content of about 50 percent by weight.

21. A composition suitable for use in the manufacture of gypsum materials, the composition comprising:
   calcium sulfate hemihydrate;
   water; and
   functionalized styrene butadiene latex polymer particles, wherein the functionalized styrene butadiene latex polymer particles have a median diameter of about 80 nanometers to about 220 nanometers and a gel content of about 15 percent by weight to about 85 percent by weight and wherein the functionalized styrene butadiene latex polymer is crosslinked by a dimethacrylate having from 2 to 30 ethoxy units between methacrylate functionalities.

22. A composition suitable for use in the manufacture of gypsum materials, the composition comprising:
   calcium sulfate hemihydrate;
   water; and
   a functionalized styrene butadiene latex polymer crosslinked by a dimethacrylate having at least four ethoxy units between methacrylate functionalities.

23. The composition of claim 22, wherein the functionalized styrene butadiene latex polymer comprises at least about 0.25 percent by weight of a monomer that conveys ionic character to the functionalized styrene butadiene latex polymer.

24. The composition of claim 23, wherein the monomer is selected from the group consisting of 2-acrylamido-2-methyl propanesulfonic acid salt, styrene sulfate salt, styrene sulfonate salt, allyl sulfonate salt, 3-sulfopropyl acrylate salt, 3-sulfopropyl methacrylate salt, 2-sulfoethyl acrylate salt, 2-sulfoethyl methacrylate salt, maleic acid, salts of maleic acid, itaconic acid, salts of itaconic acid, and mixtures thereof.

25. The composition of claim 23, wherein the monomer is a metal salt of 2-acrylamido-2-methyl propanesulfonic acid.

26. The composition of claim 23, wherein the monomer is a sodium salt of 2-acrylamido-2-methyl propanesulfonic acid.

27. The composition of claim 22, wherein the functionalized styrene butadiene latex polymer is prepared by aqueous emulsion polymerization of a monomeric mixture comprising styrene and butadiene in the presence of a seed polymer prepared by aqueous polymerization of styrene and a salt of 2-acrylamido-2-methyl propanesulfonic acid.

28. The composition of claim 24, wherein the functionalized styrene butadiene latex polymer further comprises one or more comonomers selected from the group consisting of hydroxyethyl acrylate, hydroxyethyl methacrylate, acrylonitrile, methacrylonitrile, acrylamide and methacrylamide.

29. The composition of claim 22, wherein the functionalized styrene butadiene latex polymer comprises about 45 percent by weight to about 90 percent by weight styrene, about 7 percent by weight to about 40 percent by weight butadiene, and about 2 percent by weight to about 10 percent by weight of a monomer that conveys ionic character to the functionalized styrene butadiene latex polymer.

30. The composition of claim 29, wherein the ratio of the weight of styrene to the weight of butadiene is about 10:1 to about 1:1.

31. The composition of claim 22, wherein the functionalized styrene butadiene latex polymer comprises about 70 percent by weight to about 85 percent by weight styrene, about 10 percent by weight to about 30 percent by weight butadiene, and about 3 percent by weight to about 7 percent by weight of a monomer that conveys ionic character to the functionalized styrene butadiene latex polymer.

32. The composition of claim 31, wherein the ratio of the weight of styrene to the weight of butadiene is about 7:1 to about 1.5:1.

33. The composition of claim 31, wherein the ratio of the weight of styrene to the weight of butadiene is about 6:1 to about 2:1.

34. The composition of claim 22, wherein the functionalized styrene butadiene latex polymer is present in an amount of about 0.1 percent by weight to about 10 percent by weight based on the weight of calcium sulfate hemihydrate.

35. The composition of claim 22, wherein the functionalized styrene butadiene latex polymer is present in an amount of about 0.25 percent by weight to about 5 percent by weight based on the weight of calcium sulfate hemihydrate.

36. The composition of claim 22, wherein the functionalized styrene butadiene latex polymer is present in an amount of about 0.5 percent by weight to about 1.5 percent by weight based on the weight of calcium sulfate hemihydrate.

37. The composition of claim 22, wherein the median particle diameter of the functionalized styrene butadiene latex polymer is about 80 nanometers to about 220 nanometers.

38. The composition of claim 22, wherein the median particle diameter of the functionalized styrene butadiene latex polymer is about 170 nanometers to about 190 nanometers.

39. The composition of claim 22, wherein the functionalized styrene butadiene latex polymer has a gel content of about 15 percent by weight to about 85 percent by weight.

40. The composition of claim 22, wherein the functionalized styrene butadiene latex polymer has a gel content of about 30 percent by weight to about 70 percent by weight.

41. The composition of claim 22, wherein the functionalized styrene butadiene latex polymer has a gel content of about 50 percent by weight.

42. The composition of claim 22, wherein the functionalized styrene butadiene latex polymer is crosslinked by a dimethacrylate having 4 to 22 ethoxy units between methacrylate functionalities.

* * * * *

UNITED STATES PATENT AND TRADEMARK OFFICE
CERTIFICATE OF CORRECTION

PATENT NO. : 6,525,116 B2
DATED : February 25, 2003
INVENTOR(S) : Sethuraman et al.

It is certified that error appears in the above-identified patent and that said Letters Patent is hereby corrected as shown below:

<u>Title page,</u>
Item [75], -- Richard J. Romanek -- should be listed as an inventor.

Signed and Sealed this

Twelfth Day of August, 2003

JAMES E. ROGAN
*Director of the United States Patent and Trademark Office*